(12) United States Patent
Matsubara et al.

(10) Patent No.: US 7,467,190 B2
(45) Date of Patent: Dec. 16, 2008

(54) METHOD AND APPARATUS FOR ALERT DISTRIBUTION AND ARCHIVE SHARING

(75) Inventors: Daisuke Matsubara, Santa Clara, CA (US); Kazuho Miki, San Francisco, CA (US)

(73) Assignee: Hitachi, Ltd., Tokyo (JP)

( * ) Notice: Subject to any disclaimer, the term of this patent is extended or adjusted under 35 U.S.C. 154(b) by 967 days.

(21) Appl. No.: 10/680,701

(22) Filed: Oct. 6, 2003

(65) Prior Publication Data

US 2005/0076098 A1    Apr. 7, 2005

(51) Int. Cl.
*G06F 15/16*    (2006.01)
(52) U.S. Cl. .................. 709/219; 709/217; 709/206; 709/204
(58) Field of Classification Search .................. 709/204, 709/206, 217, 223, 226, 238
See application file for complete search history.

(56) References Cited

U.S. PATENT DOCUMENTS

| | | | |
|---|---|---|---|
| 5,844,969 A | 12/1998 | Goldman et al. | |
| 6,973,464 B1* | 12/2005 | Gao | 707/201 |
| 7,219,153 B1* | 5/2007 | Day | 709/229 |
| 2002/0091774 A1 | 7/2002 | Imamura et al. | |
| 2002/0111995 A1 | 8/2002 | Mansour et al. | |
| 2003/0050986 A1 | 3/2003 | Matthews et al. | |
| 2004/0039781 A1* | 2/2004 | LaVallee et al. | 709/205 |
| 2005/0066219 A1* | 3/2005 | Hoffman et al. | 714/4 |
| 2005/0091595 A1* | 4/2005 | Shappell et al. | 715/700 |
| 2005/0102364 A1* | 5/2005 | Ozzie et al. | 709/207 |
| 2007/0192474 A1* | 8/2007 | Decasper et al. | 709/223 |

FOREIGN PATENT DOCUMENTS

EP    1 014 629 A2    6/2000

\* cited by examiner

*Primary Examiner*—Krisna Lim
*Assistant Examiner*—Philip J Chea
(74) *Attorney, Agent, or Firm*—Townsend and Townsend and Crew LLP (57) ABSTRACT

Disclosed embodiments of the present invention include a peer-to-peer network comprising management server and a notification server. Information of interest can be subscribed to by peer clients. The notification server can then notify subscribing peer clients of modified information. A pure peer-to-peer architecture is also disclosed.

7 Claims, 7 Drawing Sheets

METHOD AND APPARATUS FOR ALERT DISTRIBUTION AND ARCHIVE SHARING

CROSS REFERENCE TO RELATED APPLICATIONS

This is invention is related to U.S. application Ser. No. 10/159,144, filed May 31, 2002 (16869B-510 HAL 230); U.S. application Ser. No. 10/351,197, filed Jan. 24, 2003 (16869B-637 HAL 244), and to U.S. application Ser. No. 10/41,1941, filed Apr. 11, 2003 (16869B-761 HAL 262), all of which are incorporated herein by reference for all purposes.

BACKGROUND OF THE INVENTION

The present invention is related to computer file access and in particular to improving file access in a proprietary storage system.

The use and reliance of shared communication environments continue to increase. Along with that comes a diversity of information that must be shared among the users in a shared communication environment. An important aspect of sharing information is that users (whether human users or machine users) have access to the most recent information in order to effectively perform their individual or cooperative activities. A consideration to bear in mind is that the information can come from many different sources.

An increasingly popular communication paradigm is the peer-to-peer (P2P) network. A P2P network connects together users as "equals." Any one user connected to the P2P network can request files from another user connected to the network. Thus, a user can behave as a client in one instance, making file access requests of another user. That same user, in another instance, can behave as a server servicing requests from other users.

Often, a user requires that the file be current. In a conventional P2P network system, a user typically has to access status information in an active manner to acquire current information for a file. This will demand more time and effort for the user, especially when the user needs to get information from large numbers of sources.

It is desirable therefore to provide a user with easy access to the latest information contained in a P2P network.

SUMMARY OF THE INVENTION

Embodied aspects of the present invention include sharing information among a plurality of peer members. A peer member can subscribe to a piece of information that is of interest to her. Modifications made to the subscribed information can be detected, and the subscribing user can be notified of the fact. The subscribing user's peer client system can automatically access the information. Alternatively, a suitable presentation can be made to the user, alerting her of the modified information. The user can then decide whether to access the information.

BRIEF DESCRIPTION OF THE DRAWINGS

Aspects, advantages and novel features of the present invention will become apparent from the following description of the invention presented in conjunction with the accompanying drawings.

DESCRIPTION OF THE SPECIFIC EMBODIMENTS

Figure 1:
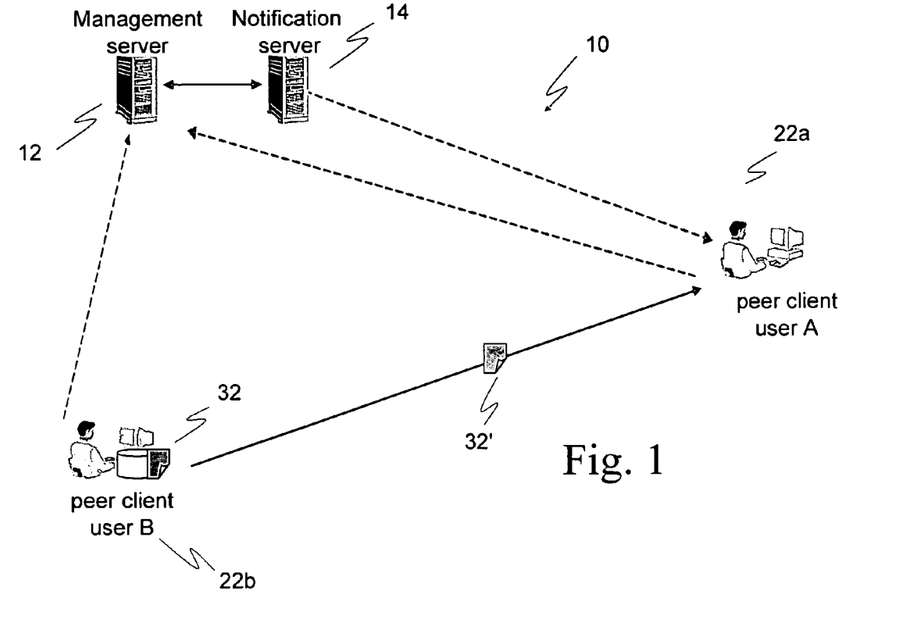
FIG. 1 shows an illustrative embodiment of a P2P network according to the present invention.

FIG. 1 shows a peer-to-peer (P2P) communication system 10 as an illustrative embodiment of the present invention. A management server 12 manages information relating to files that are being shared among peer clients (members) in the P2P network. For example, shared files that are located on the system of a peer client A are listed in the management server. Likewise, shared files that are stored on the system of another peer client B are listed in the management server. In this way, the management server provides directory services to the members in a P2P network of files to be shared among the peer members. The particular P2P architecture comprising this illustrative embodiment of the invention is more fully described in one or more of the above-referenced related applications.

In accordance with the invention, a notification server 14 is provided. A suitable communication channel is provided between the notification server and the management server 12. A communication network is understood to be provided to provide communication among the peer clients 22, 22b, the management server, and the notification server. For example, peer client A and peer client B each can communicate with the management server. The notification server can communicate with the peer clients, though the figure illustrates a communication path only with peer client A. Further details about the notification server will be discussed below.

A particular implementation of this embodiment of the invention comprises a plurality of suitably configured computer systems. The management server 12 can be a server system comprising a data processing component, communication hardware, and access to storage. Similarly, the notification server 14 can be a server system comprising similar computing and data storage equipment, but running server software different from the server software of the management server 12. The peer clients 22a, 22b can be any of a variety of computing machines of varying data processing capability and varying data storage capacity. Each server 12, 14 runs server software configured to operation its respective computer hardware according to the various aspects of the invention. Similarly, each peer client runs client software configured to operate its hardware to perform steps according to the various aspects of the invention.

File sharing according to the particular P2P network shown in FIG. 1 comprises each peer client 22a, 22b informing the management server 12 of its files to be shared. For example, peer client B can communicate list of files contained in its system to be shared with other peer clients. Peer client B can specify particular access permissions for each file, including specifying peers or groups of peers who can access the file(s). These and other aspects of P2P access are more fully discussed in one or more of the above-referenced applications.

Other peer clients can communicate with the management server 12 to obtain a listing of files on the P2P network. Each peer client is presented with a suitable listing of files consistent with the access permissions imposed by the owners of the files. The management server provides information indicating the location of a file to a peer client that desires to access the file. The location information can identify any peer client that might have a cached copy of the file, or it can identify the location of owner of the file. Using the location information, the peer client then communicates with the peer client that has the file to access the file. These and other aspects of P2P access are more fully discussed in one or more of the above-referenced applications.

Figure 2:
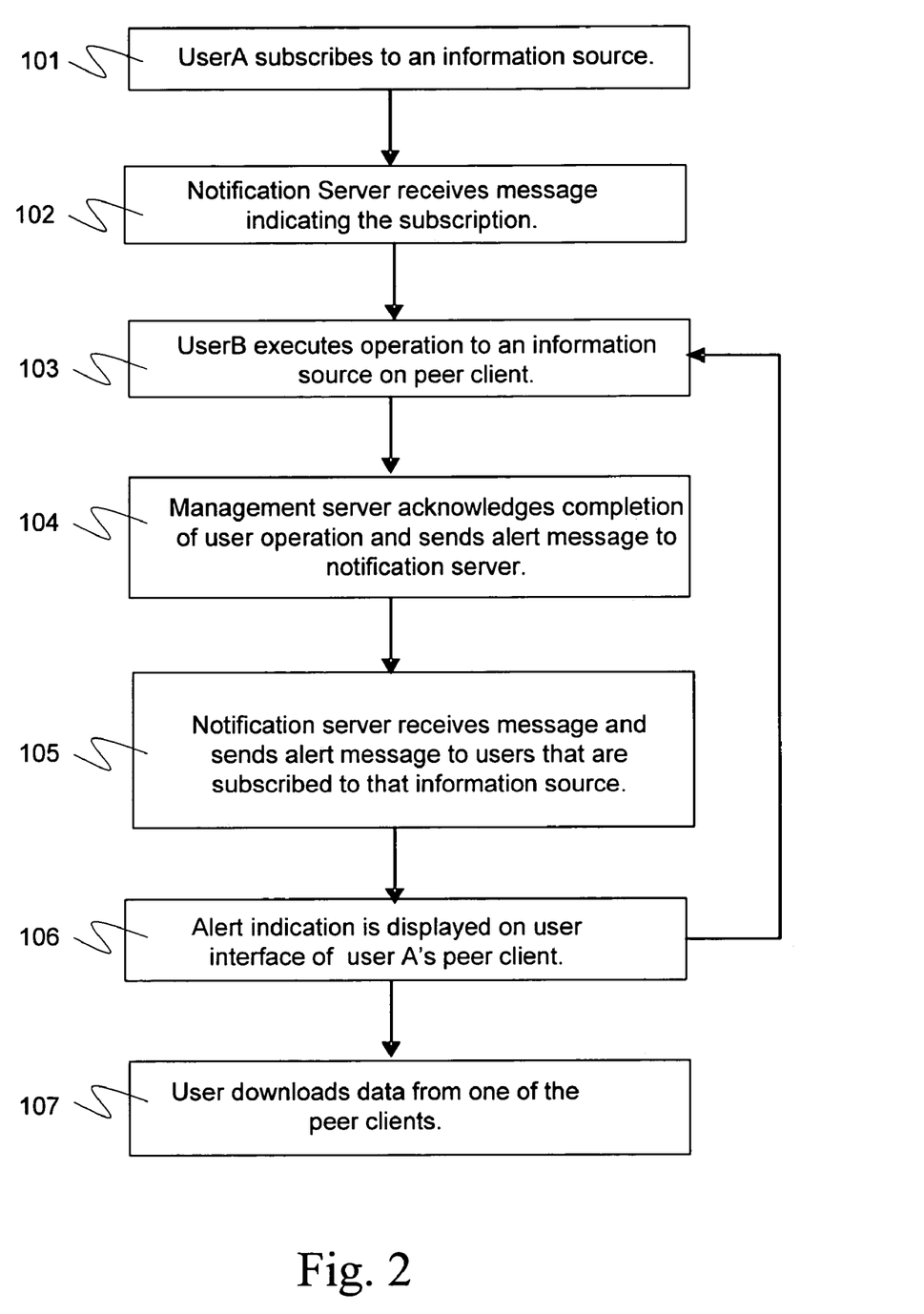
FIG. 2 is a flowchart highlighting the processing according to the illustrative embodiment of the P2P network shown in FIG. 1.

FIG. 2 is a high level flow chart of the processing that can occur in accordance with the invention as embodied in the communication system shown in FIG. 1. A peer client (e.g., peer client 22a) communicates with the notification server 14 to "subscribe" to an information source, in a step 101. In accordance with the present invention, the term "information source" includes all forms of electronic information (e.g., documents, multimedia files, images, audio files, video files, folders, directories, and so on). An information source can be a virtual shared space where a BBS (bulletin board service) is shared by peer members. An information source can also refer to a virtual shared space where a conference can take place among two or more communicating peers. In particular, the information source can correspond to events occurring during the conference. For example, suppose a group of peer members are participating in a conference over the network (e.g., voice over IP conferencing, chat room type conference, and so on). Events relating to the conference might include the act of someone joining the conference, or the act of someone leaving the conference. Arbitrary actions can be defined as notable events, such as a vote that is taken among the participants in a conference. In accordance with the present invention, a peer client can "subscribe" to such events.

The notification server 14 receives (in step 102) a message indicating that peer client 22a requests a subscription to a particular information source, referred to as a "subscribed information source." For the sake of discussion, suppose peer client 22a has subscribed to File-X 32, which is owned by peer client 22b. In the context of the present invention, a "subscription" to an information source, the act of "subscribing" to an information source, and other variants, means that the subscriber will be notified of any changes that occur to the subscribed information source. Thus, if peer client 22b, who owns File-X, modifies the file, then peer client 22a, who subscribed to File-X, will be made aware of the modification. The notification server 14 manages a plurality of subscribed information sources as peer clients send subscription requests to it.

Thus, for example, suppose peer client 22b modifies File-X 32 in a step 103. The peer client software running on the peer client's system will communicate a suitable message to the management server 12. This informs the management server that File-X has been modified. Additional detail is provided in U.S. application Ser. No. 10/159,144. Then, in a step 104, the management server will communicate information identifying modified information sources to the notification server. Thus, the management server will communicate a message to the notification server 14 that File-X has been modified.

In a step 105, the notification server 14, in response to receiving the message from the management server 12, communicates an alert message to each peer client that has subscribed to File-X. In the example shown in FIG. 1, peer client A is notified by the notification server that File-X has been modified. In a particular implementation, the technology for communicating the alert message is known as "push" technology, also known as "webcasting" and "PointCasting" by which information is sent directly to the computer system rather than being retrieved by the computer. The alert message can include information indicating the time the operation was executed, the name of the file/folder, the type of operation (creating folder, deleting folder, registering file, deleting file, updating file, etc.), a user ID of the user who executed the operation, an ID of the virtual folder where the folder/file is located.

In one implementation, the notification server 14, upon receiving a message from the management server 12, determines the information source that was modified. The notification server then determines those subscribers who have subscribed to the information source and notifies each subscriber. In another implementation, the notification server 14 may simply notify all peer members in the P2P network. In that implementation, the peer client software can determine whether it subscribed to the information source identified in the alert message.

In a step 106, the peer client software of peer client 22a can be configured to display an appropriate alert indication in response to receiving the alert message from the notification server 14, to inform the peer client as to the fact of the modified File-X. As noted above, the alert message can include location information as to the location of the modified file.

In a step 107, the peer member can view the alert and can decide whether to access the information or not. If she decides she wants to access the information, her peer client software can access the information, in which case a copy 32' of File-X can be obtained. This can be done using typical procedures used in a P2P system. The peer client communicates with the management server 12 and with one of a number of peer clients to download (or otherwise) the information. The information may be:

a voice recording of a conference, file submitted for the conference, conference memo, etc.

a BBS Message body, comment body, file attachments to message/comment, etc.

file data

After the information is accessed, it can be displayed, or played back, or otherwise processed by the peer client. In is noted that in an another implementation, the peer client software can be configured to automatically start accessing the information without direction from the user to access the information.

Referring back to step 103, the information source can be the posting of a message by the peer client 22b on a shared BBS. A shared BBS can comprise messages which are stored among one or more peer members. The management server 12 can serve as a central location for organizing the messages of a shared BBS, such as maintaining a list of messages, maintaining the message threads, maintaining the location of each message, and so on. The management server can manage information for many such BBS's. Thus, when a new message is to be posted to a particular BBS, the peer client software running on the peer client that is posting the message would inform the management server that a message is being posted on a particular BBS. The management server could then inform the notification server 14 of this fact (step 104).

Then in step 105, the notification server can identify the list of subscribers to the BBS and alert each subscriber of the newly posted message. The alert message sent to each subscriber could include the time the message was posted, the title of the BBS message, the type of operation (create, add message, delete message, add comment, delete comment, etc.) performed, a user ID of the user who executed the operation, and ID of the virtual share space where the BBS is located (e.g., an internet address), and so on.

Referring again to step 103, the information source can correspond to events relating to a conference. In the P2P network shown in FIG. 1, the management server 12 can manage a conference among the peer members. The management sever can maintain a list of peer members who are participating in a conference. Communication among participants in the conference is performed by each participant, typically by appropriately broadcasting their messages to each participant. A peer member wishing to join the conference communicates a suitable request to the management server. The management server then informs the new member of the other participants (e.g., by providing a list of Internet addresses), and informs the existing participants of the new member. In accordance with the present invention, the management server can also communicate a message to the notification server 14 about the new participant (step 104). The notification server can then communicate an alert message to any subscriber that has "subscribed" to the conference that a new participant has joined the conference. The alert message can include the time the conference began, the title of the conference session, the event (create conference, join, leave, submit file, etc.), a user ID of the user who performed the event, an ID of the virtual shared space where the conference is located, etc.

Similarly, when a participant leaves a conference, the leaving participant communicates a suitable message to the management server 12. The management server can then inform the other participants that someone is leaving the conference. This allows the other participants to cease sending their respective messages to the participant who left. The management server can also inform the notification server 14 of the event. It can be appreciated that other events can be similarly noted.

In addition, when a peer client subscribes to a conference, the peer client can specify to be notified of certain activities. For example, the peer client may only be interested in learning of new participants joining a conference. The peer client can even specify activities associated with specific peer client (s). For example, a peer client may only be interested in being alerted by the notification server as to when "John Smith" joins a particular conference, or when he leaves.

Figure 3:
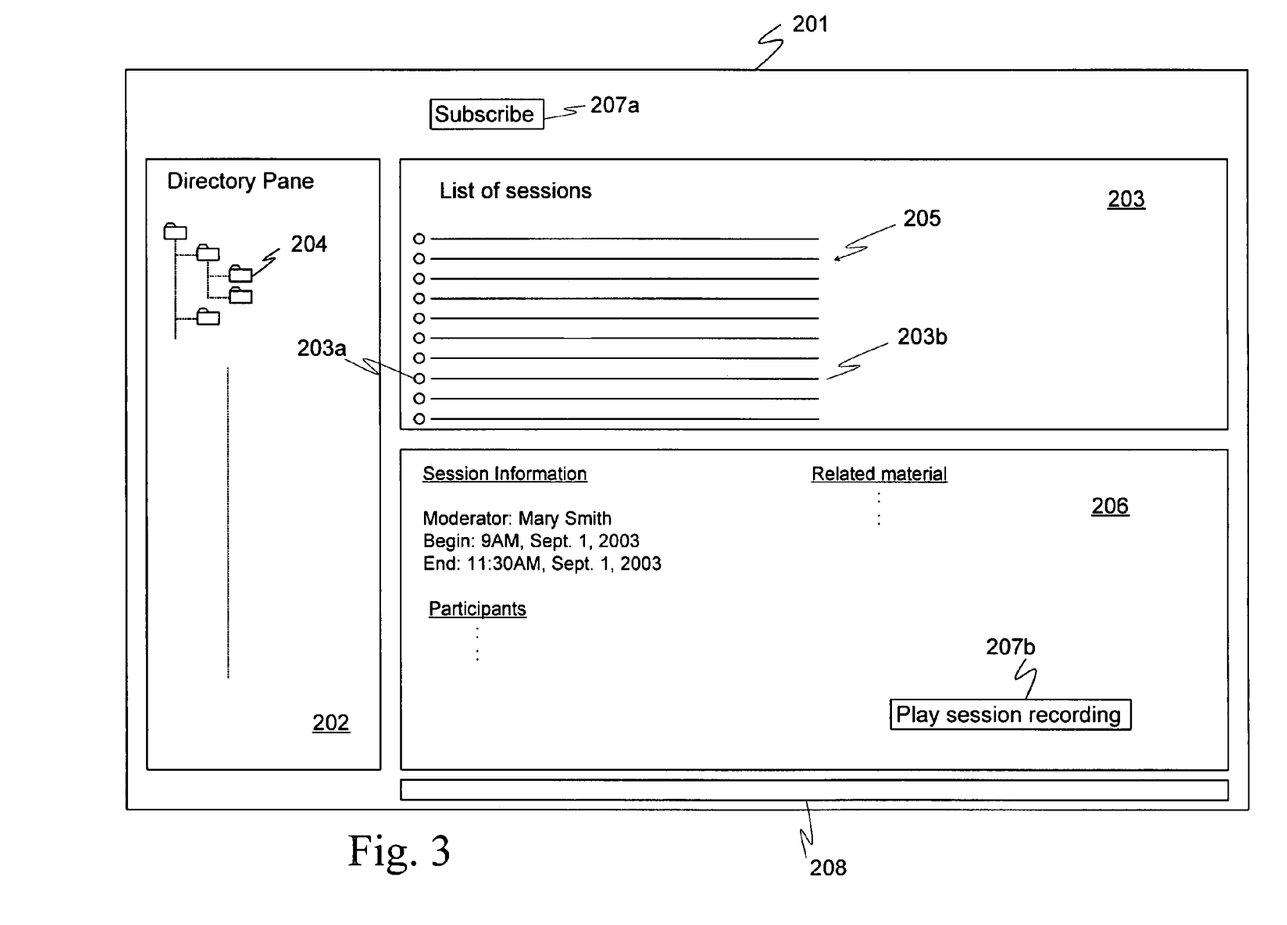
FIG. 3 is a schematic representation of an illustrative example of an interface in accordance with the present invention.

FIG. 3 is a schematic representation of an illustrative example for a peer client user interface 201 to view information sources for conferences. A graphic representing a window 202 contains a directory tree that shows the structure of a folder directory. Conferences are typically organized into "conference rooms." Each conference room holds one or more "conference sessions." Conferences can be represented in much the same way that files are represented, i.e., hierarchically. Conference rooms can be represented by folders (conference folders) in a graphical representation of a directory. Each conference folder may contain zero or more objects which represent conference sessions. A conference session can be represented by different icons to represent different states of the conference session; e.g., active, inactive, voting, and so on. Thus, in a graphical representation of a directory structure, some of the folders displayed may be conference folders, within which are documents (objects) which represent conference sessions.

When a user selects a conference folder (e.g., 204) in the window 202, a list of conference sessions that are located in the selected conference folder can be displayed in a display window 203. Each conference sessions can be represented by a suitable icon 203*a* and a text string 203*b* can be present that identifies certain information about the conference session, such as session title, session moderator, etc.

The user can select a conference session by double-clicking on one of the conference sessions 205. In response, additional information relating to the selected conference can be displayed in a window 206. For example, the session title of the selected conference session can be repeated in the window 206 and supplemented with additional information such as the name of the session moderator, a list of participants, the session start time, and the end time if the session has concluded. A list of files submitted by the participants, along with the name of the submitting participant can be displayed. Any conference memos, notes, and so on, that might have been created during the session can be displayed. The contents of the material can be accessed by double-clicking, for example, on an appropriate graphic.

Typically, the actual media and text files which are represented in the window 206 are stored among the machines/system of the peer members who participated in the conference session. Thus, when user accesses the contents of a file, the requesting peer client accesses the management server 12 to obtain information identifying which peer member has the file. The requesting peer client then communicates with the peer member to obtain the file.

A suitable recording or transcript of the conference session can be played back. A PLAY button 207*b* is provided. The user can click on the play button 207*b* to perform a playback of the conference recording, if one is available. Typically, the conference session recording comprises files (text, multimedia, etc.) stored among the peer members who participated in the conference meeting. The requesting peer client communicates with the management server 12 to obtain information as to the location(s) of the file(s) which constitute the recorded conference session. The requesting peer client can then access the other peer clients to download the files, and provide a playback presentation of the conference session to the user. Although not shown, it can be appreciated that suitable playback controls can be provided, including fast forward, rewind, pause, and so on.

In accordance with the present inventions, each folder is regarded as an information source to which users can subscribe. To subscribe to an information source, user can select a folder and click a SUBSCRIBE button 207*a*. Alternatively, the user can perform a so-called "right-click" action by clicking the right-most mouse button to effect the same operation of subscribing. Still another alternative is to subscribe via a pull-down menu. Thus, in the example GUI shown in FIG. 3, the user can subscribe to a conference session by selecting a folder (e.g., 204) associated with a conference. The notification server 14 is then informed by the subscribing peer client of the subscription, as discussed in FIG. 2, for example. It can be appreciated that a user can subscribe to different aspects of a conference session as well. For example, the user may be interested in any changes that might be made to a particular memo that is associated with the conference. The user can select the file of interest, which is accessible from the window 206, and subscribe to that file. The user can then be notified of any changes to the file.

It can be appreciated that folders shown in the directory window 202 can include conventional electronic documents, and other information sources. For example, shared BBS's can be represented in the directory hierarchy. A user can subscribe to files by selecting one or more files and clicking on the SUBSCRIBE button 207a.

An indicator 208 can be provided which flashes for a moment to catch the user's attention that an alert has been received. The indicator can continue to flash, or change color, or the like as a persistent indication of a received alert. This is convenient if the alert was received while user was away from the display.

Figure 4:
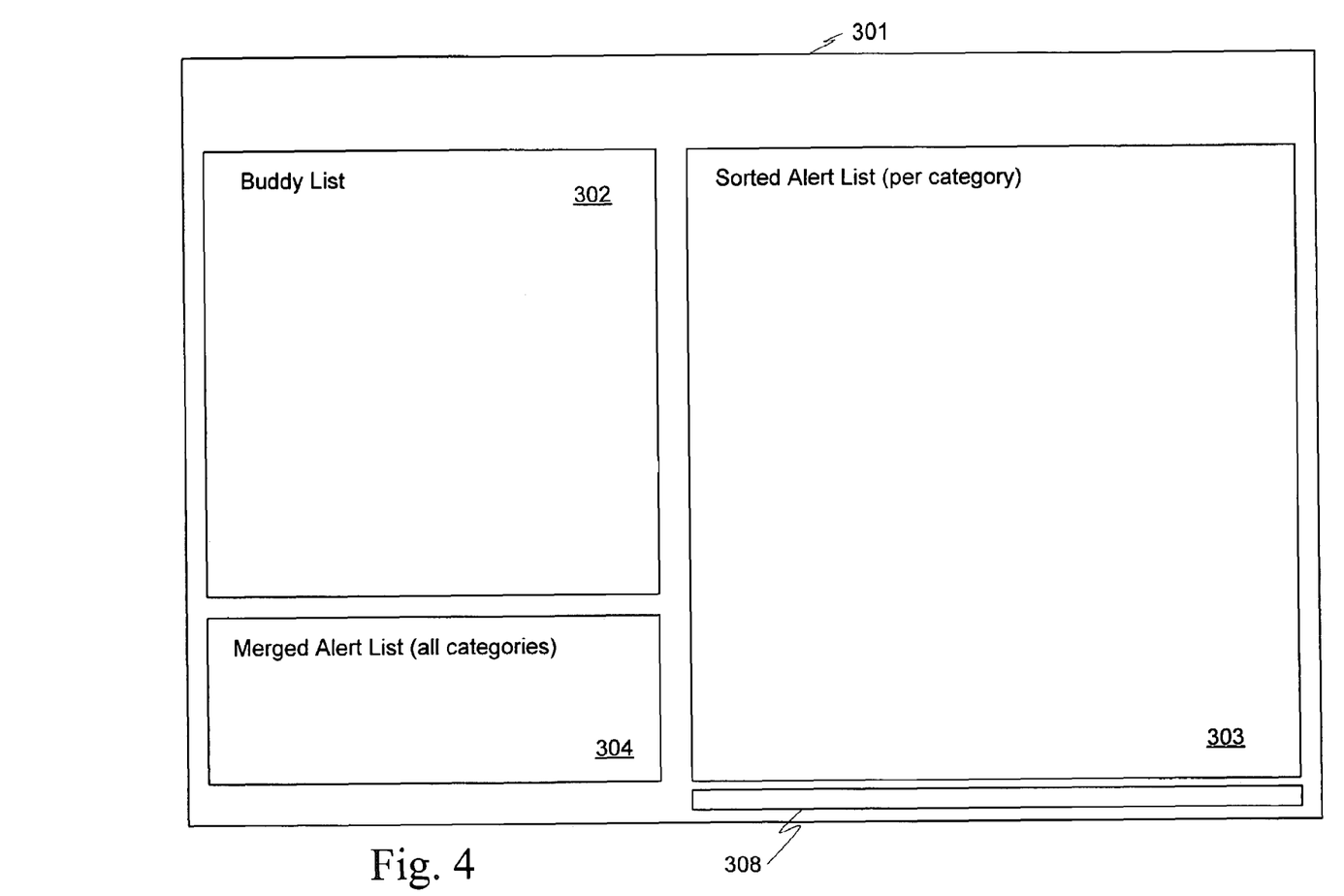
FIG. 4 is a schematic representation of an illustrative example of an alert display in accordance with the present invention.

FIG. 4 depicts an example of a peer client user interface for viewing alert messages. A window 302 displays a "buddy list" which shows presence information for one or more peer members in the P2P network. The notion of presence information is discussed in greater detail in U.S. application Ser. No. 10/411,941. A window 304 provides a list of all the alerts that were sent from the notification server 14. This list can be ordered by time of receipt of the; alert. A window 303 can be provided which presents the received alerts based on category. For example, the alerts can be arranged based on the type of information that is being alerted, such as conference meeting alerts, file modification alerts, directory modification alerts (e.g., some changes the access permission of a directory). Alerts can be sorted according to the peer member, to show the activity occurring on a particular peer member's machine.

Figures 5, 6:
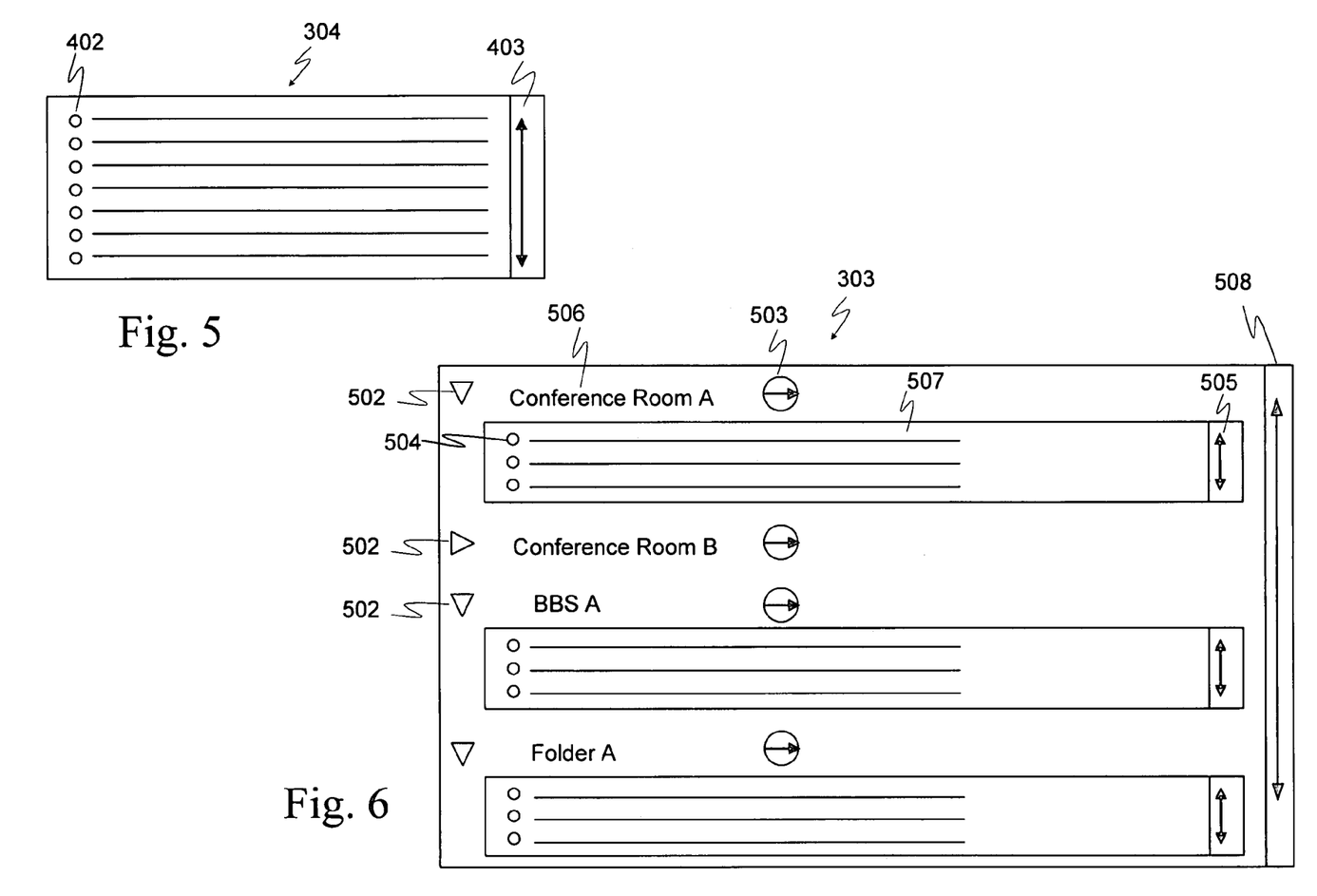
FIG. 5 is a schematic representation of a display showing details of a window in the alert display shown in FIG. 4.
FIG. 6 is a schematic representation of a display showing details of another window in the alert display of FIG. 4.

FIG. 5 shows details for an example embodiment of the window 304 shown in FIG. 4. The alerts can be listed in the window 304, as mentioned, in order of time of receipt from the notification server 14. Each alert can have an associated button graphic 402. Clicking on the button graphic 402 can bring up a window (not shown) that displays information about the alert. For example, the time of receipt of the alert can be provided. A scroll bar 403 can be provided, allowing the user to scroll through the list of alerts. Alternatively, a wheel device on a mouse input device can be used to scroll the window up and down. In still another alternative, the user can "jump" to the information source that is the object of the alert when she clicks on the button graphic 402. For example, a GUI window can be opened and contents of the information source that is the object of the alert can be shown.

FIG. 6 shows the detail for an example embodiment of the window 303 of FIG. 4 for a sorted list of alerts. In the embodiment shown, the list of alerts are organized based on which originating source it came from. For example, FIG. 6 shows alerts being organized by conference sessions, BBS's, and by folder. Categories for a conference titled "Conference A" and for a conference titled "Conference B" are shown. A bulletin board service titled "BBS A" is shown, and a Folder A is shown. A name field 506 displays the category name.

Toggle buttons 502 can be used to display the list of alerts 504 for each category. The user can click a toggle button 502 to open or close a display field 507 containing the information sources for each alert. The list of alerts can be scrolled using scroll bar 505, or by the use of a mouse wheel, and the like. A second scroll bar 508 can be provided for scrolling through the list of categories.

The user can click a button 503 to jump to the information source. When this button is clicked, a GUI window for viewing the information source can be opened to that particular information source. The user can presented with a virtual space/folder where the originating information source of the alert is located. An icon or text of the actual object (conference sessions, BBS messages, files, etc.) can be highlighted to identify the object of the alert as it appears in the virtual space. It can be appreciated that a similar "jump" action can occur when the user clicks on the button 504.

When a peer client receives an alert message, the alert can be dynamically inserted to the list. The user may also configure which alerts should be insert/displayed and which alerts should be ignored. An indicator 308 can be used to call the user's attention to the fact that an alert has been received. The alert can be persistent, requiring the user to actively acknowledge receipt of the alert. This reduces the likelihood that the alert is missed. Alternatively, the indicator can simply flash for a brief period of time and then cease flashing. The alerts can be paced such that they are presented to the user a rate that the user can process them. This is convenient if alerts arrive at a very fast pace. Still other alternatives for indicating the arrival of alerts can be imagined.

Figure 7:
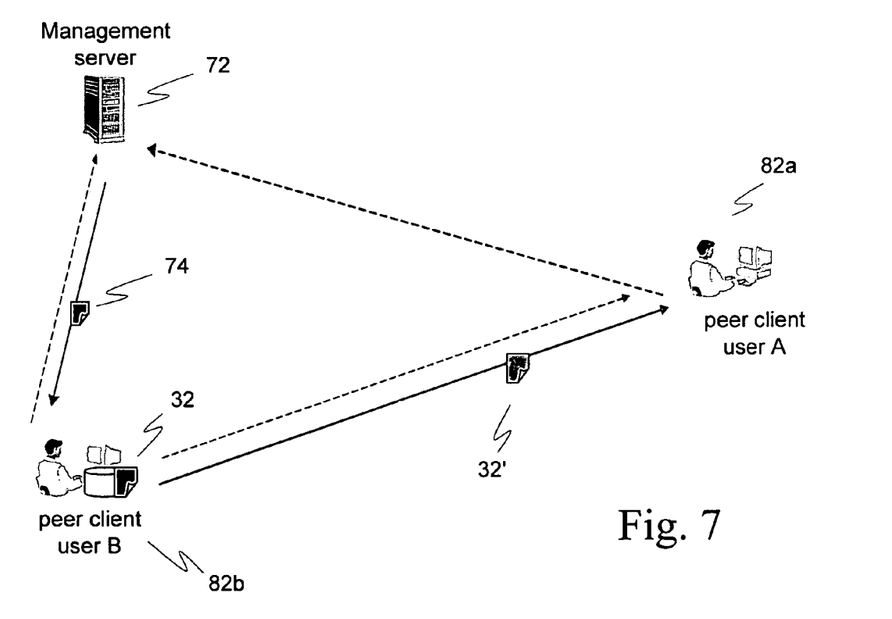
FIG. 7 shows another illustrative embodiment of a P2P network according to the present invention.

Referring now to FIG. 7, a second illustrative embodiment of the present invention is shown. In this configuration, the function of the notification server 14 shown in FIG. 1 is provided in an enhanced management server 72 and P2P client software. The management server 72 is configured to provide subscription service to the peer members 82a, 82b of the P2P network. The enhanced client software running on the P2P clients provides notification services.

Figure 8:
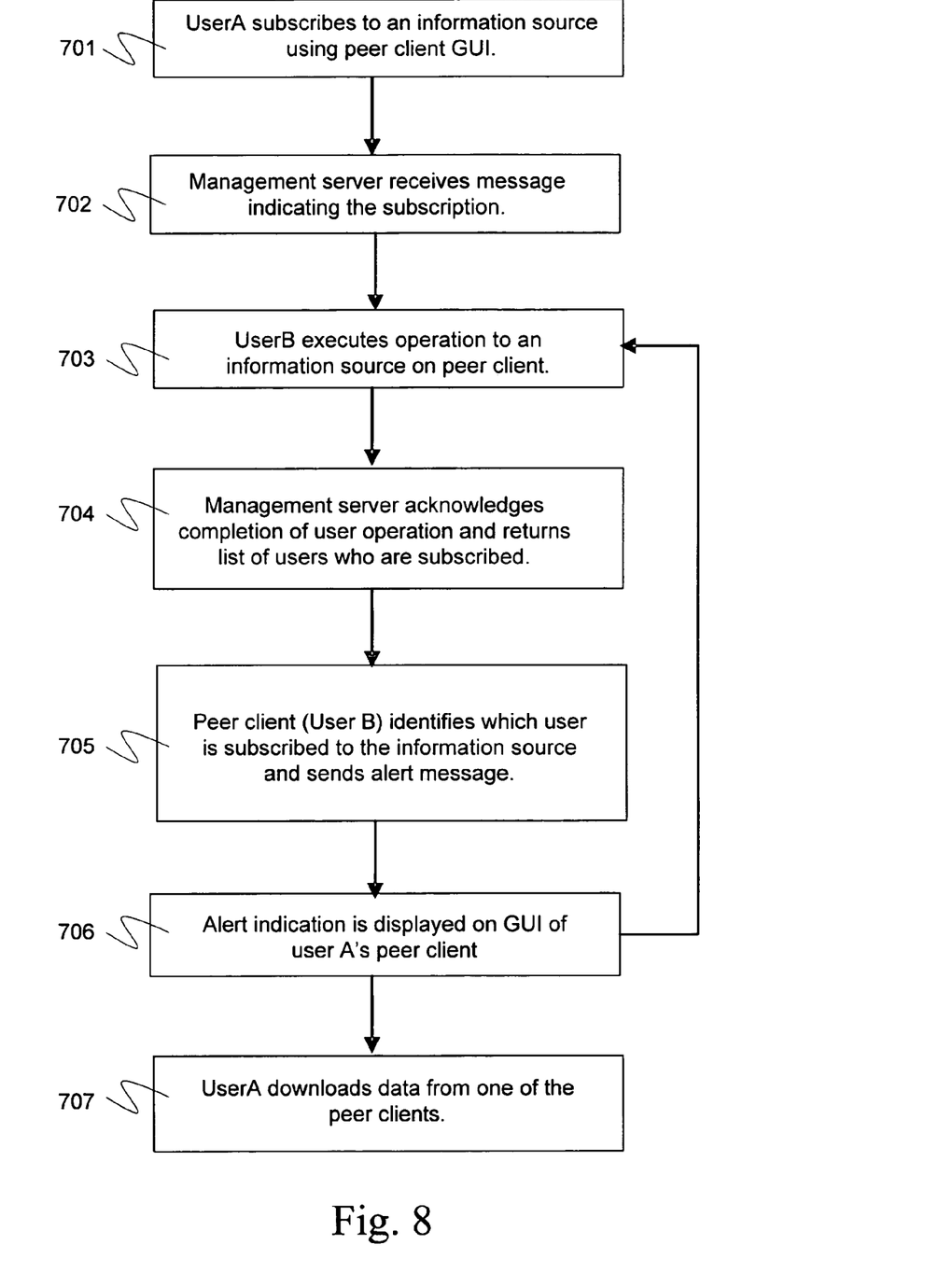
FIG. 8 is a flowchart highlighting the processing according to the illustrative embodiment of the P2P network shown in FIG. 7.

FIG. 8 illustrates the processing highlights of the embodiment shown in FIG. 7. In a step 701, a user (e.g., user A, 82a) communicates with the management server 72 to subscribe to an information source, using a suitable interface such as a GUI. When the management server receives the request it will register and store the request, in a step 702. Later, in a step 703, a user (e.g., user B, 82b) performs an operation on the information source to which user A has subscribed. As part of the normal process for accessing the information source, user B must interact with the management server 72. The enhanced client software on the system of user B accesses a list of subscribers that may be associated with the particular information source. The management server returns a suitable list of information 74 to user B, step 704. For example, the list of information can include addressing information that allows user B to communicate with the subscribing member.

In a step 705, user B can then communicate a suitable message to each subscribing member, thus alerting that member to the fact that the information source to which they subscribed has been modified. Referring back for a moment to FIG. 7, this step is shown by the communication flow from client 82b to client 82a.

In a step 706, the alert message is received and displayed by each subscribing peer member, for example as in the manner discussed above. The enhanced client software of the subscribing P2P member then accesses the information source. FIG. 7 shows that the information source comes from user B. However, it can be appreciated that the information source can be from a different P2P client. Information of the location of the information source can be provided in the list of information 74 provided by the management server 72.

Figure 9:
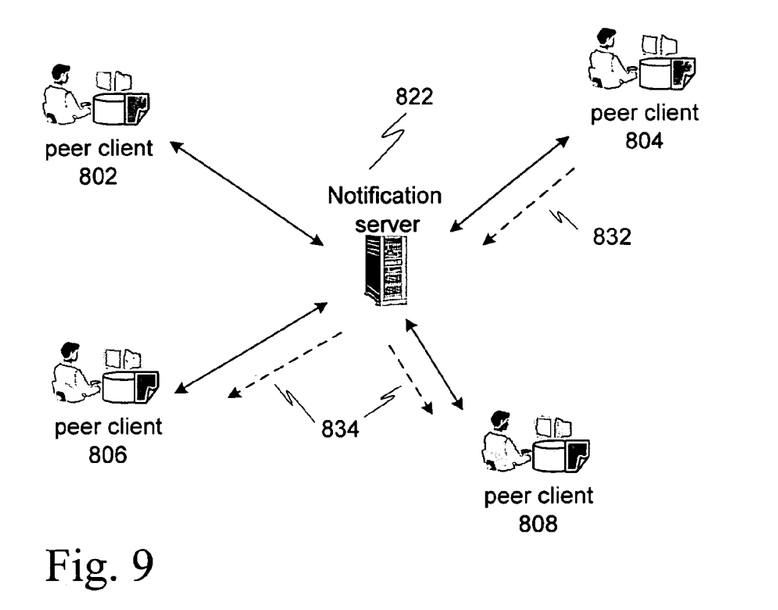
FIG. 9 shows yet another illustrative embodiment of a P2P network according to the present invention.

FIG. 9 shows yet another illustrative embodiment of the present invention. In this embodiment, the P2P network is a pure P2P network; there is no management server, as in the case of FIGS. 1 and 7. It is understood that each of the P2P members 802-808 can communicate with each other over a suitable communication network. In this particular embodiment of the invention, a notification server 822 is provided. The client software for each P2P member 802-808 is configured to allow a user to subscribe to an information source by communicating a suitable subscription request to the notification server 822. When a P2P member (e.g., member 804) modifies an information source, that member notifies 832 the notification server 822 of the action. The notification can include information as to the location of the affected information source. The notification server can then "push" 834 a message to P2P members who have subscribed to that information source.

Figure 10:
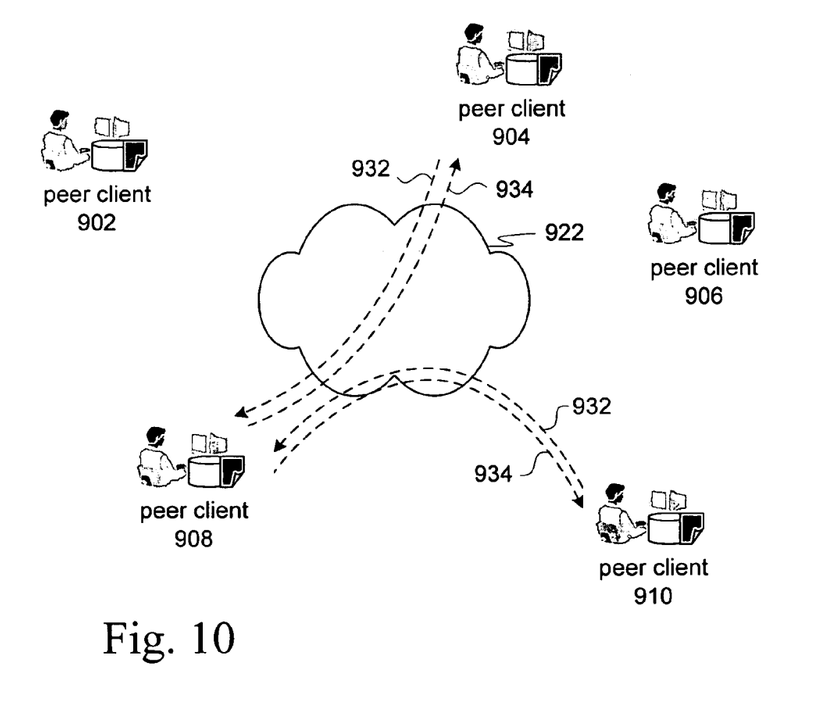
FIG. 10 shows still another illustrative embodiment of a P2P network in accordance with the present invention.

FIG. 10 shows still another illustrative embodiment of the present invention. Here, a pure P2P network is provided. The function of the notification server is provided in the client software of the P2P members 902-910. A communication network (e.g., Internet) interconnects the members. Each information source that is owned by a P2P member can have associated information that identifies each subscriber. Thus, a P2P member (e.g., 904, 910) can subscribe 932 to an information source owned by another member 908. When that information source is modified, the member 908 can communicate a message 934 to subscribers of the information source. Alternatively, the client software of the member 908 can broadcast a message to all members that an information source has been modified. Only those members who have subscribed could then respond.

What is claimed is:

1. A method for accessing information in a peer to peer network, the method comprising:

storing information among a plurality of peer client systems, wherein the information can be accessed by the peer client systems, the information collectively referred to as information sources;

storing, in a first server system, location information indicative of a location of each information source, wherein the peer client systems are configured to communicate with the first server system to access the location information;

generating, in the first server system, one or more subscriptions, wherein each subscription is associated with an information source and with one or more peer client systems, thereby indicating that the one or more peer clients systems is to be notified of any changes to the information source, and wherein the peer client systems are configured to communicate with the first server system to subscribe to one or more information sources;

detecting, in the first server system, a modification to an information source, the step of detecting comprising receiving, from a first peer client system, an indication that a first information source has been modified, and if the first server system determines that there is a first subscription that is associated with the first information source, communicating to the first peer client system a list of second peer client systems that are associated with the first subscription, wherein the first peer client system communicates an alert message to each second peer client system using peer to peer (P2P) communication, the alert message including information indicating that the first information source has been modified, wherein each second peer client system can access an information source that is associated with the alert message, a copy of the information source being stored in another peer client system, and wherein each second peer client system can access the copy from the other peer client system.

2. The method of claim 1 wherein one of the second peer client systems automatically accesses the information source that is associated with the alert message.

3. The method of claim 1 wherein the first information source is modified by the first client system.

4. A system for sharing information in a peer to peer network comprising:

a plurality of peer clients, each peer client in communication with other peer clients, wherein each peer client stores information, collectively referred to as information sources, wherein the information sources can be shared among the peer clients; and a management server having information indicative of locations of the information sources, the management server configured to communicate with a peer client to provide location information to an information source so that the peer client can access the information source;

the management server further configured to receive requests from peer clients for subscriptions to one or more information sources, each such information source referred to as a subscribed information source, and to associate each subscribed information source with one or more peer clients, thereby indicating that the one or more peer clients is to be notified of any changes to the subscribed information source, the management server further configured to receive information from a first peer client indicative modifications made to one or more of the information sources, each such information source referred to as a modified information source, the management server further configured to identify one or more second peer clients based on a comparison of the modified information source against the subscribed information sources, and to communicate a list that identifies the second peer clients to the first peer client, wherein the first peer client can communicate an alert message to each of the second peer clients using peer to peer (P2P) communication, the alert message including information indicating that the one or more information sources have been modified, and wherein each second peer client, in response to receiving an alert message, can access a first information source associated with the alert message.

5. The system of claim 4 wherein one of the second peer clients automatically accesses at least a first information source associated with the alert message.

6. The system of claim 4 wherein one of the second peer clients generates a display to inform a user of receipt of the alert message, wherein the user can decide whether to access an information source associated with the alert message.

7. A method for accessing information in a peer to peer network, the method comprising:

storing information among a plurality of peer client systems, wherein the information can be accessed by the peer client systems, the information collectively referred to as information sources;

storing, in each peer client system, location information indicative of locations of one or more information sources, wherein the peer client systems can access the location information in order to determine the locations of the one or more information sources;

generating, in each peer client system, one or more subscriptions, each subscription being associated with an information source and with one or more peer client systems, thereby indicating that the one or more peer clients systems is to be notified of any changes to the information source, the step of generating comprising receiving a subscription request from a first peer client system and associating one or more information sources with the first peer client system, the one or more information sources identified in the subscription request; and detecting, in each peer client system, a modification to an information source, the step of detecting comprising receiving an indication that a first information source has been modified and, if there is a subscription associated with the first information source, communicating an alert message to each peer client system that is associated with the first subscription from another peer client system using peer to peer (P2P) communication, the alert message including information indicating that the first information source has been modified, wherein each peer client system that receives the alert message can access an information source that is associated with the alert message, a copy of the information source being stored in another peer client system, and wherein each peer client system that receives an alert message can access the copy from the other peer client system.

* * * * *